United States Patent [19]
Kwok

[11] Patent Number: 5,280,276
[45] Date of Patent: Jan. 18, 1994

[54] COMBINATION MOUSE/TRACKBALL INPUT DEVICE

[75] Inventor: Wong W. Kwok, Kowloon, Hong Kong

[73] Assignee: Quickshot (BVI) Ltd., Tortola, British Virgin Isls.

[21] Appl. No.: 911,540

[22] Filed: Jul. 10, 1992

[51] Int. Cl.$^5$ .............................................. G09G 5/00
[52] U.S. Cl. ..................................... 345/167; 345/163
[58] Field of Search ................. 340/710, 709; 250/221

[56] References Cited

U.S. PATENT DOCUMENTS 4,562,347 12/1985 Hovey et al. ........................ 340/710
5,063,289 11/1991 Jasinski et al. ...................... 340/710
5,162,780 11/1992 Solhjell ............................... 340/710

*Primary Examiner*—Jeffery Brier
*Attorney, Agent, or Firm*—Amir H. Raubvogel; Albert C. Smith

[57] ABSTRACT

A combination mouse/trackball input device for an electronic computer functions as either a mouse or a trackball, depending on which of two operating modes the user selects. The user selects the desired mode by moving a selector handle to one of two positions, which causes a tracking ball to be raised to trackball mode or lowered to mouse mode. In mouse mode, the tracking ball makes contact with the mouse pad or other flat surface on which the device rests so that the ball rotates when the device is moved. This mode is suitable for general purpose use. In trackball mode, the tracking ball is elevated so that it does not make contact with the mouse pad, but it projects through an aperture in the top face of the enclosure. In this mode, which is preferred for applications requiring fine control over the cursor position, the user rotates the ball directly with his or her fingers. The device permits easy switching between the two modes with minimal interruption of the user's work. In both modes, rollers sense the rotation of the tracking ball along two axes and a photo detector mechanism converts this rotation into electrical pulses which are sent to the attached computer. The computer uses the pulses to calculate the movement of the tracking ball along two axes and to move an on-screen cursor accordingly.

16 Claims, 8 Drawing Sheets (ONLY VERTICAL MOVEMENT IS ALLOWED)

(ONLY CIRCULAR MOVEMENT IS ALLOWED)

Section D-D

COMBINATION MOUSE/TRACKBALL INPUT DEVICE

BACKGROUND OF THE INVENTION

1. Field of the Invention

This invention relates to input devices for electronic computers and, more particularly, to a device which functions as either a mouse or a trackball, depending on the user's selection.

2. Description of the Related Art

Many computers, particularly those which utilize a graphical user interface, can be controlled by causing a pointer, or cursor, to move on the computer screen. This cursor is used to select commands, manipulate data, activate menus and windows, and so on. Typically, one or more function buttons are available to send activation signals to the computer when the buttons are pressed, or "clicked". Thus, for example, a user can choose a command from an on-screen menu by moving the cursor to a position atop the desired command and clicking a function button to activate the command.

The user must employ some form of input device to generate the signals required by the computer to move the cursor on the screen. The most effective types of input devices for this purpose are those which permit an intuitive correspondence, or mapping, between the user's physical manipulation of the input device and the movement of the on-screen cursor.

Several such devices are well known. Two of the most common are:

a) The mouse, wherein a tracking ball protrudes through an aperture in the bottom face of the device, so that the ball rotates when the device is moved along a flat surface. The cursor moves in accordance with the movement of the device.

b) The trackball, wherein a tracking ball protrudes through an aperture in the top face of the device. The user rotates the ball with his or her fingers, and the cursor moves in accordance with this rotation.

Each of these devices has advantages and disadvantages. Ordinarily, the mouse is the preferred device for general use. It is favored over the trackball, especially for applications where the control button must be held down while the on-screen cursor is moved. In such situations, it is relatively easy for the user to keep his or her finger on the button as he or she moves the device on the pad.

The mouse, however, is not ideally suited for finely detailed work, such as drawings, where the user requires precise control over the cursor. For such uses, the trackball is superior, since the user has more direct control over the tacking ball. Also, with a trackball the user can press the function buttons without any danger of inadvertently moving the cursor, as can happen with the mouse.

For many users, who alternate between general use and finely detailed work, neither the mouse nor the trackball is an ideal solution by itself. Such users would benefit from a combination of the two devices, one that is easily switchable between the two modes of operation.

SUMMARY OF THE INVENTION

In accordance with the present invention, an input device for an electronic computer is disclosed which functions as either a mouse or a trackball, depending on which of two operating modes the user selects. The two operating modes are characterized by two different vertical positions of the tracking ball.

In mouse mode, the tracking ball is at its lower position so that it projects through an aperture in the bottom face of the enclosure and rests against the surface on which the enclosure rests. This surface may be a mouse pad or any other flat surface. When the device is in this mode, the tracking ball rotates as the user slides the device along the surface, as in a conventional mouse.

In trackball mode, the tracking ball is at its upper position within the enclosure so that it projects through an aperture in the top face of the enclosure, but does not project through the aperture in the bottom face. In this mode, movement of the device does not cause the tracking ball to rotate, since the ball is no longer in contact with the mouse pad. Rather, the user causes the tracking ball to rotate by using his or her fingers to manipulate the portion of the ball which projects through the aperture in the top face, as in a conventional trackball.

The mechanism for raising and lowering the tracking ball may comprise a handle which projects through an aperture in the side of the enclosure. The user selects the desired mode by moving the handle to one of two extreme positions. Movement of the handle causes the tracking ball to move up or down to the correct position for the selected mode. In this way, the user can switch between the two modes quickly and easily, with minimal interruption of his or her work.

BRIEF DESCRIPTION OF THE DRAWINGS

FIG. 6a shows the device in mouse mode; FIG. 6b shows the device in transition between mouse and trackball modes; and FIG. 6c shows the device in trackball mode.

DESCRIPTION OF THE PREFERRED EMBODIMENT

Figure 1:
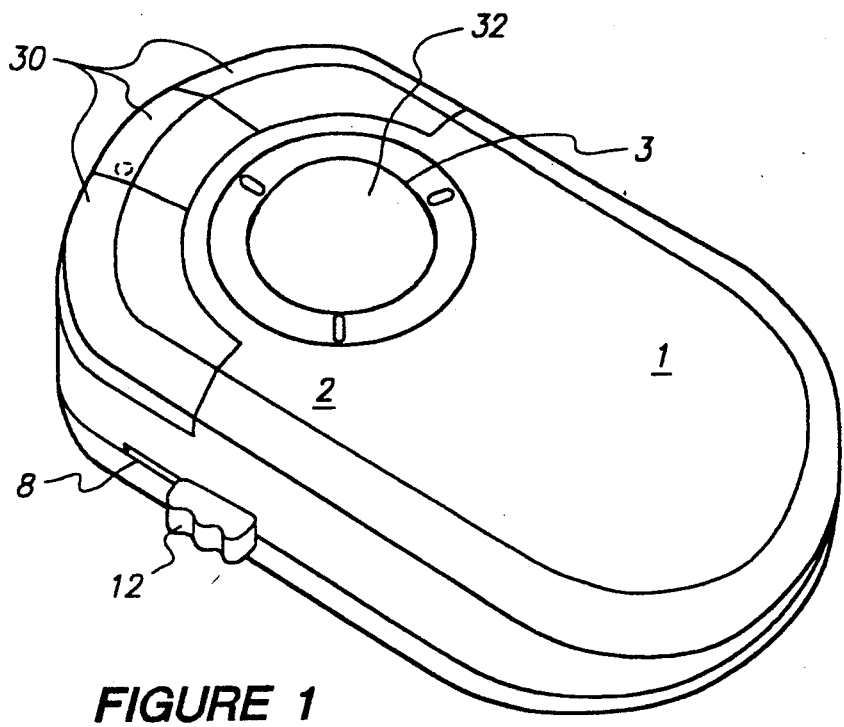
FIG. 1 is a perspective view of a mouse/trackball device according to the present invention.

Referring now to FIG. 1, there is shown a perspective view of the input device. The device includes an enclosure 1 having an aperture 3 in its top face 2 and an aperture 5 in its bottom face 4. On the top face 2 are three function buttons 30 which activate momentary switches inside the device. Within the enclosure is a tracking ball 32, which can project through the top aperture 3 or the bottom aperture 5, depending on its vertical position. The device rests on a mouse pad or similar flat surface 31. The bottom face 4 is flat so that the device does not wobble on the flat surface 31. A handle 12 projects through an opening 8 in the side of the enclosure.

The device has two operating modes: mouse mode and trackball mode. The user moves the handle 12 to one of two positions in order to choose between modes.

Figure 2:
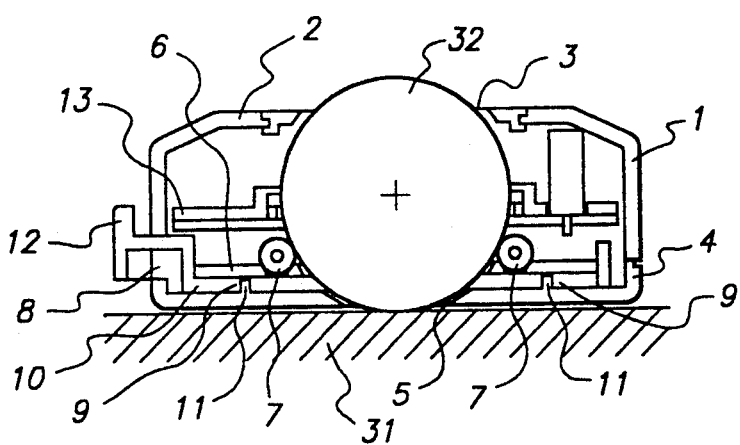
FIG. 2 is a side sectional view of the device in mouse mode, wherein the sides of the enclosure have been omitted.

Referring now to FIG. 2, the device is shown in mouse mode. The tracking ball 32 is in its lower position so that it projects through the bottom aperture 5 and makes contact with the mouse pad 31. In this position, the tracking ball 32 rotates as the device is moved across the mouse pad 31. The tracking ball 32 is shown projecting through the top aperture 3, but this is not necessary when the device is in mouse mode.

Figure 3:
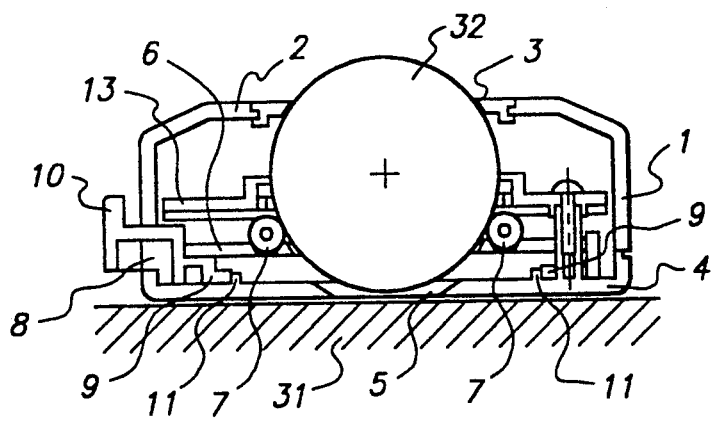
FIG. 3 is a side sectional view of the device in trackball mode, wherein the sides of the enclosure have been omitted.

Referring now to FIG. 3, the device is shown in trackball mode. Now, the tracking ball 32 is raised to its upper position so that it no longer projects through the bottom aperture 5. Thus, it is no in contact with the mouse pad 31, and does not rotate when the device is moved. In this position, the tracking ball 32 projects through the top aperture 3, and the user manipulates the tracking ball 32 directly in order to cause it to rotate.

Referring now to FIGS. 2, 3, 4, 5, 6a, 6b, and 6c, the mechanism for raising and lowering the tracking ball 32 is shown. The handle 12 is connected to a selector 10 which rotates as the user moves the handle 12. The selector 10 supports a bearing holder 6 by means of three cams 11 which engage depressions 9 in the bearing holder 6. The cams 11 and the depressions 9 are constructed so that when the selector 10 rotates, the bearing holder 6 moves vertically. This is accomplished as follows. In mouse mode, the cams 11 fit inside the depressions 9 so that the bearing holder 6 is supported in its lower position. In trackball mode, the selector 10 is rotated so that the cams 11 are no longer aligned with the depressions 9. Thus, the bearing holder 6 is supported in its upper position.

Figure 6A:
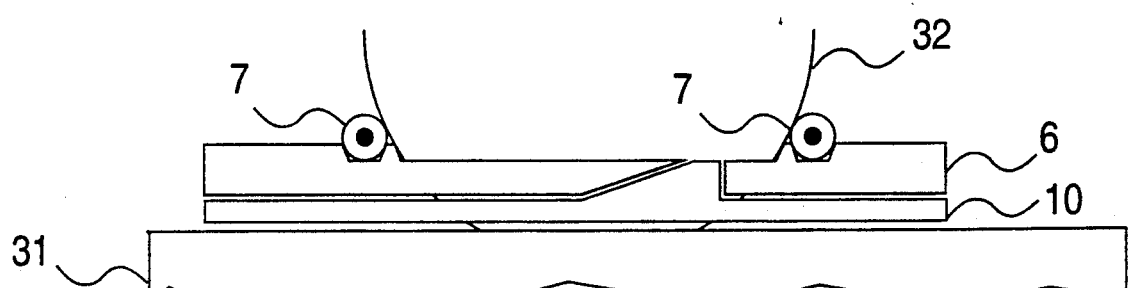
FIGS. 6a, 6b, and 6c are a three-part schematic representation of the tracking ball, bearing holder, selector, and bearings, illustrating the mechanical principle of changing from mouse mode to trackball mode.
Figure 6B:
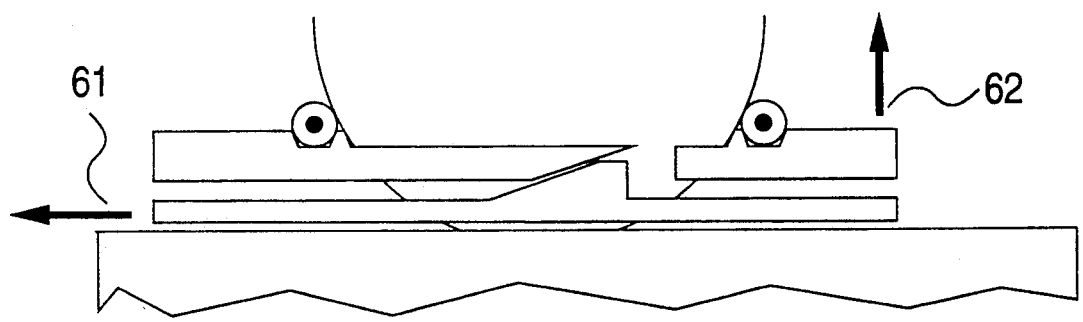
Figure 6C:
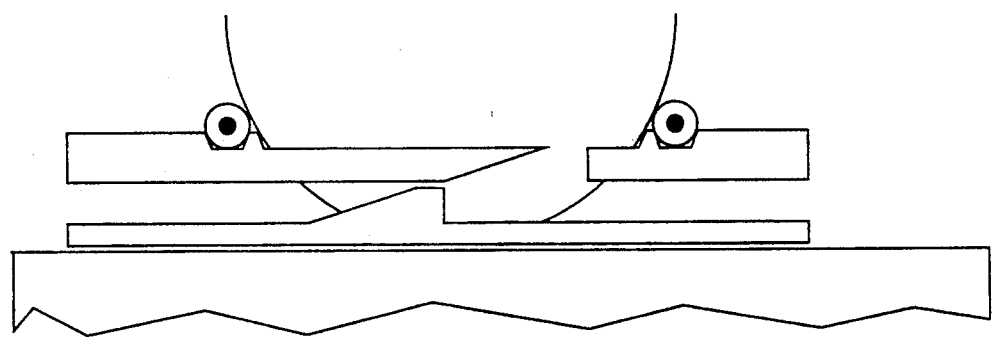

Three bearings 7 are mounted on the bearing holder 6 around an aperture in the center of the bearing holder 6. These bearings 7 support the tracking ball 32 without restricting its rotation in any direction. In FIG. 6b, the direction of rotation of the selector 10 is shown by an arrow 61, and the direction of motion of the bearing holder 6 is shown by another arrow 62.

To summarize, then, the user moves the handle 12 to one of two positions. In response to this movement, the selector 10 rotates, which causes the bearing holder 6 to move up or down. Bearings 7 attached to the bearing holder 6 move correspondingly. The bearings 7 support the tracking ball 32 to move it to one of two positions: the lower position for mouse mode, or the upper position for trackball mode.

A base plate 13 is fixed within the enclosure and does not move when the mode is changed. This base plate 13 provides support for the mechanism which converts the rotation of the tracking ball 32 into electrical pulses corresponding to its rotation along two axes.

Figure 7:
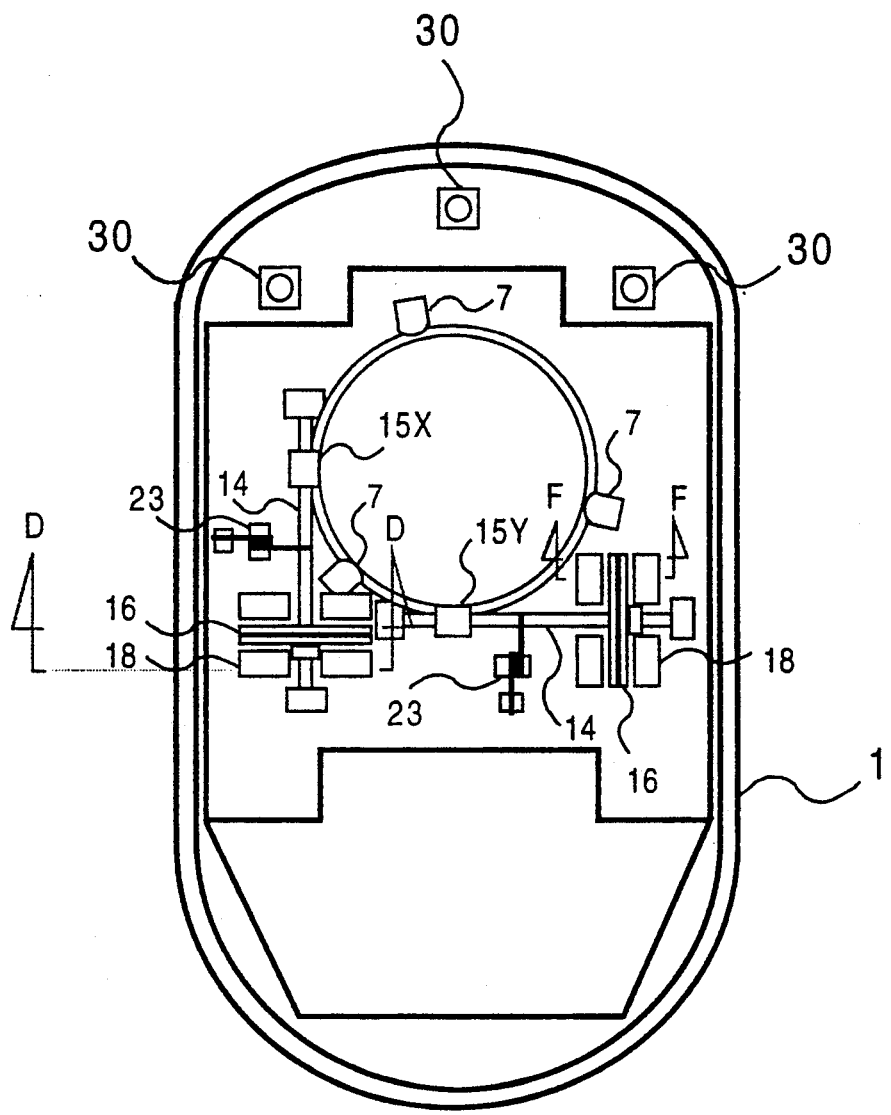
FIG. 7 is a top view of the device, wherein the top half of the enclosure has been removed.
Figure 8:
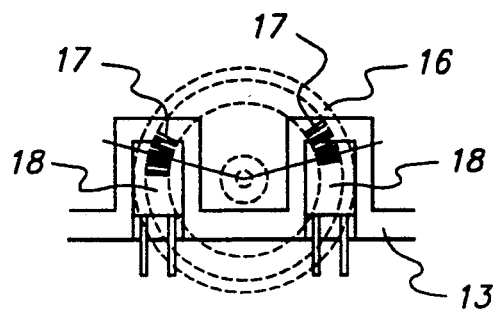
FIG. 8 is an enlarged view of section D—D of FIG. 7, showing the photo detector mechanism and the wheel from a side view parallel to the shaft axis.
Figure 9:
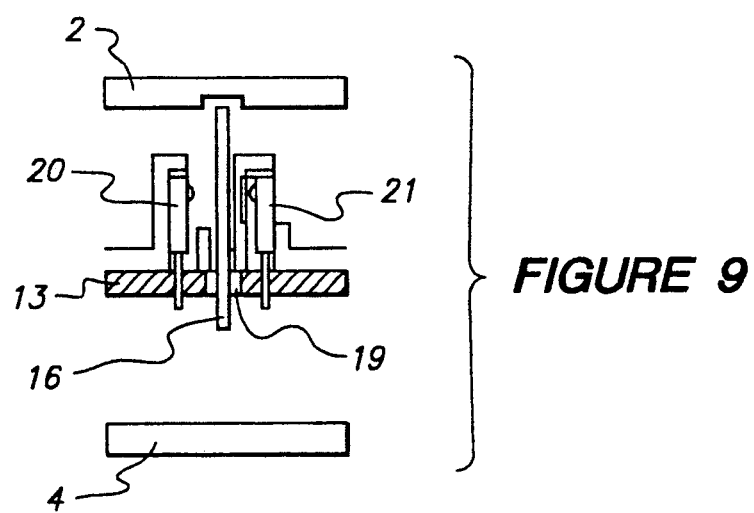
FIG. 9 is an enlarged view of section F—F of FIG. 7, showing the photo detector mechanism and the wheel from a side view perpendicular to the shaft axis.

Referring now to FIGS. 7, 8, and 9, the base plate 13 and attached mechanism are shown. Two rollers 15X and 15Y (collectively referred to as rollers 15) are positioned in contact with the tracking ball 32 at points ninety degrees displaced about its surface. Each roller 15 detects rotation of the tracking ball 32 about one of the tracking ball's axes. Thus, the X-axis roller 15X rotates in accordance with rotation of the tracking ball 32 about its X-axis, and the Y-axis roller 15Y rotates in accordance with rotation of the tracking ball 32 about its Y-axis. Each roller 15 is connected to a shaft 14 to cause the shaft 14 to rotate in accordance with rotation of the corresponding roller 15. The shafts 14 are positioned substantially parallel to the base plate 13 and at right angles to one another. They are supported by means, described below, which permit slight pivoting of each shaft 14 as is necessary to maintain contact between the rollers 15 and the tracking ball 32 at all times. A spring 23 urges each shaft in the direction of the tracking ball 32 in order to maintain contact between the rollers 15 and the tracking ball 32.

A wheel 16 is connected to each shaft 14 for rotation therewith. The wheels 16 project through openings 19 in the base plate 13. Each wheel 16 has several slits 17 oriented radially and spaced equidistantly near the perimeter. A photo detector assembly 18 is positioned on the base plate 13 near each wheel 16. On one side of each photo detector assembly 18 is a light source 20 which projects light in the direction of the corresponding wheel 16. On the other side of each photo detector assembly 18 is a receptor 21 which receives light from the light source 20 as the light passes through the slits 17 in the wheel 16. As the wheel 16 rotates in conjunction with the shaft's 14 rotation, the light received by the receptor 21 is repeatedly interrupted. The receptor 21 sends an electrical pulse for each interruption in the received light. These electrical pulses are sent to the attached computer, which interprets the pulses and calculates the exact movement of the tracking ball in the X and Y directions. Given this information, the computer can move its on-screen cursor in conventional manner in accordance with the movement of the input device's tracking ball 32.

Figure 4:
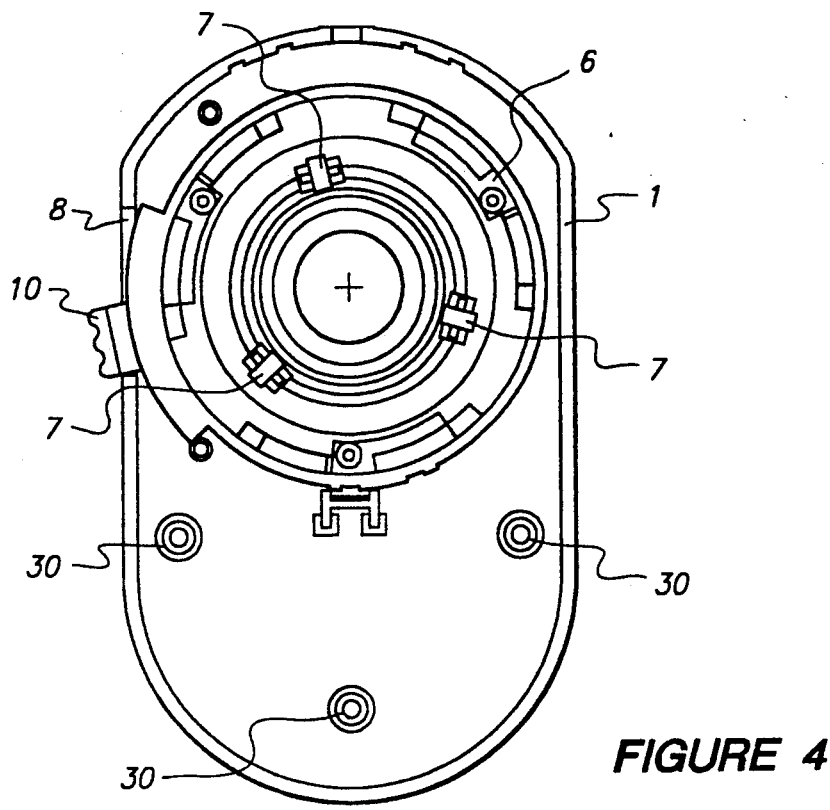
FIG. 4 is a top view of the device, wherein the top half of the enclosure, the base plate and structures attached thereto, and the tracking ball have been omitted.
Figure 5:
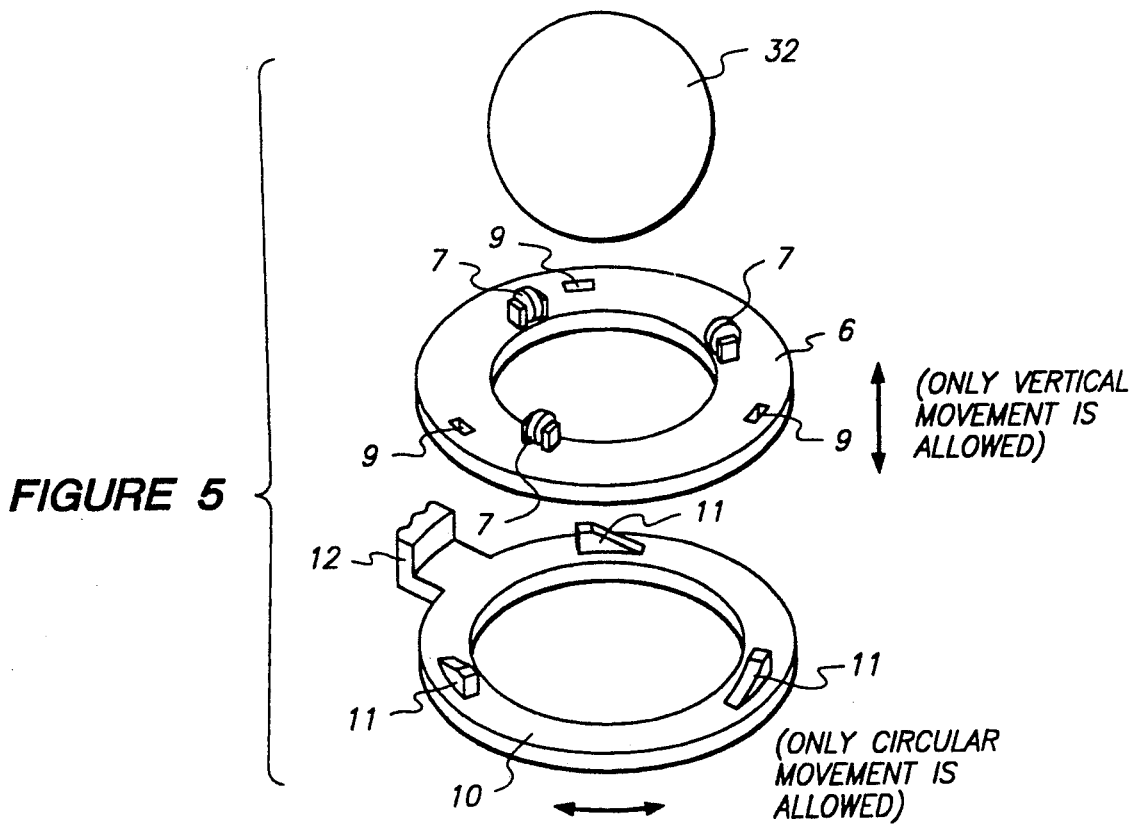
FIG. 5 is a perspective view of the tracking ball, bearing holder, selector, and bearings, illustrating the interaction among these components.

As shown in FIGS. 4 and 7, three momentary switches 30 are mounted within the enclosure 1. These are connected to the function buttons 30 shown in FIG. 1. When the user presses one of the function buttons 30, the corresponding momentary switch 30 makes contact and sends an activation signal to the attached computer. Typically, These buttons are used for selecting commands or performing other activities related to the on-screen position of the cursor on the attached computer.

Figure 10:
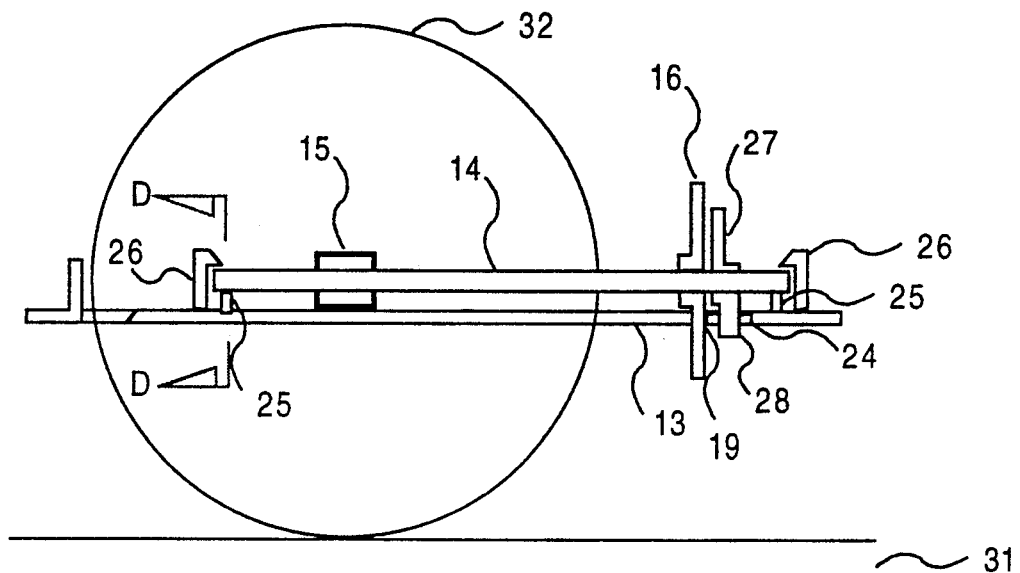
FIG. 10 is a side view of the tracking ball, roller, shaft and attached elements, photo detector assembly, and shaft support means.
Figure 10A:
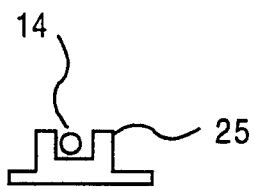
FIG. 10a is a section view of FIG. 10.
Figure 11:
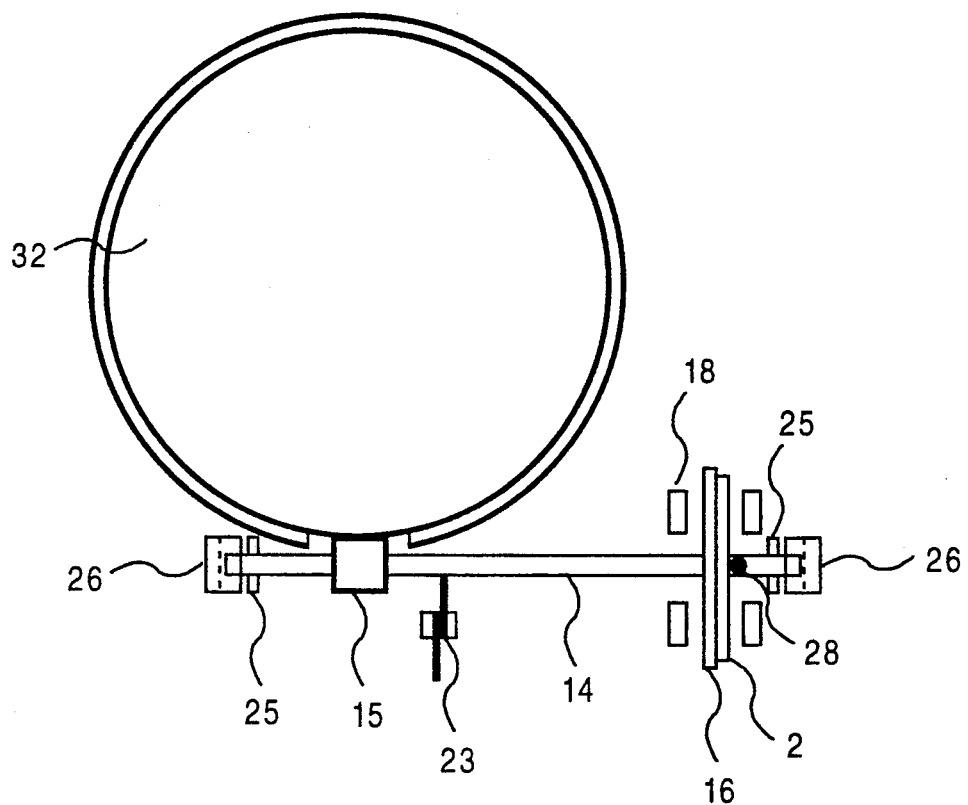
FIG. 11 is a top view of the tracking ball, shaft and attached elements, photo detector assembly, and shaft support means in trackball mode.
Figure 12:
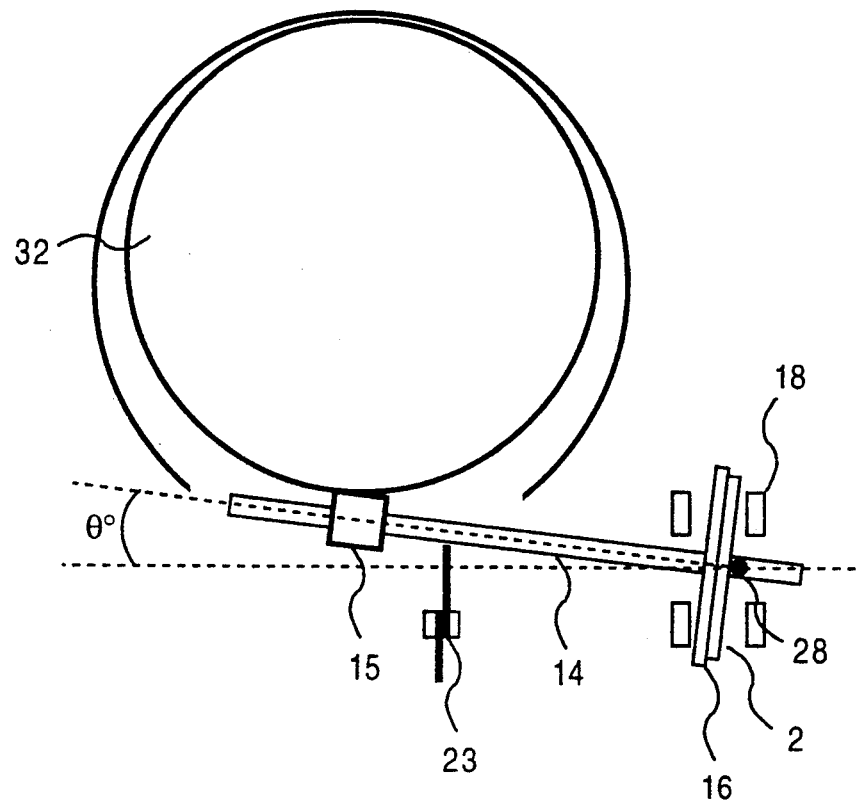
FIG. 12 is a top view of the tracking ball, roller, shaft and attached elements, photo detector assembly, and shaft support means in mouse mode.

Referring now to FIGS. 10, 11, and 12, details of the mechanism for keeping the rollers 15 in contact with the tracking ball 32 are shown. For clarity, only one of the two shaft assemblies is shown in each figure. As the tracking ball 32 moves from trackball mode to mouse mode, the position of the rollers 15 with respect to the tracking ball 32 changes from the equator of the tracking ball 32 to a latitude slightly displaced from the equator. As the position changes, the rollers 15 must move horizontally in order to maintain contact with the tracking ball 32. If they did not move, there would be a gap between the rollers 15 and the tracking ball 32 as their relative positions changed.

As shown in FIG. 10, a rib 25 and hook 26 on each end of the shaft 14 provides support for the shaft 14 while permitting it to pivot. The shaft 14 projects through a slot plate 27 adjacent to the wheel 16. A peg 28 connected to the slot plate 27 projects through a peg-hole 24 in the base plate 13 and provides a pivot point for the shaft 14. Thus, the shaft 14 is free to rotate and its ends are free to slide slightly along the ribs 25 as it pivots about the peg 28.

The pivoting movement of the shaft assembly is shown in FIGS. 11 and 12. FIG. 11 shows the position of the shaft 14 when the device is in trackball mode, and FIG. 12 shows the position of the shaft 14 when the device is in mouse mode. A spring 23 urges the shaft 14 to pivot about the peg 28 in the direction of the tracking ball 32 so that the roller 15 is always in contact with the tracking ball 32. The angle of displacement of the shaft 14 is greatly exaggerated in FIG. 12 for illustrative purposes.

Alternatively, the shaft support means could be constructed so that, when urged by the spring 23, the shaft assembly shifts its position towards the tracking ball 32 rather than pivoting. In this embodiment, the slits 17 in the wheel 16 would have to be long enough so that the photo detector's light source 20 could send light through the slits 17 in either of the two positions of the wheel 16.

A second alternative would have the shaft assembly shift position rather than pivot, and the photo detector assembly 18 would be coupled to the shaft support means so that the photo detector assembly 18 would shift position in conjunction with the shifting of the shaft assembly. The wheel 16 and the photo detector assembly 18 would maintain the same position relative to each other; thus, the slits 17 in the wheel 16 would not have to be elongated.

I claim:

1. An input device for an electronic computer, comprising:

an enclosure having a top face and a bottom face, the top face and bottom face each having a circular aperture;

a tracking ball having a smooth surface and being positioned inside said enclosure for vertical movement therein, and having an upper position in which it projects through the aperture in the top face of said enclosure and having a lower position in which it projects through the aperture in the bottom face of said enclosure;

support means for said tracking ball, coupled to said tracking ball;

adjusting means coupled to support means to raise and lower said support means to cause said tracking ball to project through the bottom aperture when in the lower position and to project through the aperture in the top face when in the upper position; said support means including a bearing holder, supported by said adjusting means, comprising a disk having an aperture of diameter less than the diameter of said tracking ball to permit said tracking ball to project through the aperture when supported by the support means, and including a plurality of bearings, attached to said bearing holder around the circumference of the aperture in said bearing holder for supporting said tracking ball thereon without restricting the rotation of said tracking ball; and first and second means, each coupled to the tracking ball, for generating a series of electrical pulses representing the rotation of said tracking ball about one of two orthogonal axes.

2. The input device according to claim 1, wherein:
said enclosure has an opening on one side;
said bearing holder has a plurality of depressions in its bottom surface around the circumference of the aperture in said bearing holder; and
said adjusting means comprises:

a selector positioned under said bearing holder and comprising a disk having a top surface, a bottom surface, and a circular aperture in the center of the disk of diameter equal to or greater than the diameter of the aperture in said bearing holder;

a plurality of cams on the top surface of said selector located around the circumference of the aperture, equal in number to the number of depressions in said bearing holder and positioned and shaped to engage said depressions, for supporting said bearing holder at variable height depending on the rotational orientation of said selector in relation to said bearing holder; and a handle attached to the outer edge of said selector to project through said opening on the side of said enclosure, to cause said selector to rotate when said handle is moved.

3. The input device according to claim 2, wherein said means for generating a series of electrical pulses comprises:

a base plate, oriented horizontally and positioned within the enclosure at fixed height, having a circular aperture larger than the diameter of said tracking ball;

two shafts, each positioned within the enclosure substantially parallel to the bottom face thereof, adjacent to said tracking ball and at right angles to each other;

shaft support means connected to and supported by said base plate, disposed to rotatably support said shafts within said enclosure;

a roller on each shaft, positioned in contact with said tracking ball at points ninety degrees displaced about the surface of said tracking ball for rotation therewith;

resilient means connected to and supported by said base plate, disposed to urge said rollers in contact with said tracking ball as said tracking ball is moved between said upper and lower positions; and pulse generation means connected to and supported by said base plate, coupled to each shaft for generating a series of electrical pulses at a rate proportional to the rate of rotation of the associated shaft.

4. The input device according to claim 3, wherein:
each of said pulse generation means comprises:

a wheel connected to one of said shafts for rotation therewith, each wheel comprising a disc and a plurality of slits oriented radially and spaced equidistantly near the perimeter of the disc; and one or more photo detectors connected to and supported by said base plate, for detecting the rate of rotation of said wheel; and said base plate has two wheel openings, each aligned with one of said wheels to permit rotation of said corresponding wheel.

5. The input device according to claim 4, wherein said photo detectors each comprise:
   a light source positioned to project light through the slits in the associated wheel; and
   a receptor positioned to receive light from said light source through the slits in said wheel and to send an electrical pulse for each interruption in the received light.

6. The input device according to claim 5, wherein:
   each said shaft support means permits pivoting of shaft therein about a point on the corresponding shaft within the corresponding photo detector; and
   each said resilient means for keeping said rollers in contact with said tracking ball comprises a spring coupled to a corresponding shaft for urging said shaft and attached roller and wheel to pivot in the direction of said tracking ball.

7. The input device according to claim 5, wherein:
   said base plate has two peg-holes, each adjacent to one of said wheel openings; and
   each said shaft support means comprises:
      two ribs coupled to said base plate, each rib supporting one end of said shaft while permitting lateral movement of said shaft;
      two hooks coupled to said base plate, each hook positioned at one end of said shaft adjacent to one of said ribs, for preventing vertical movement of said shaft while permitting lateral pivoting movement of said shaft;
      a slot plate, positioned adjacent to said wheel, having a plurality of slots in alignment with the slots on said wheel to permit light to pass through said wheel and said slot plate; and
      a peg, attached to said slot plate and supported in the peg-hole to hold said slot plate adjacent to said wheel while permitting said slot plate and said wheel to pivot about the peg-hole.

8. The input device according to claim 5, wherein:
   each said shaft support means permits pivoting of a shaft therein about a point on the corresponding shaft adjacent to the corresponding photo detector; and
   each said resilient means for keeping said rollers in contact with said tracking ball comprises a spring coupled to a corresponding shaft for urging said shaft and attached roller and wheel to pivot in the direction of said tracking ball.

9. The input device according to claim 5, wherein:
   each said shaft support means permits lateral movement of a shaft therein;
   each said resilient means for keeping said rollers in contact with said tracking ball comprises a spring coupled to a corresponding shaft for urging said shaft and attached roller and wheel in the direction of said tracking ball; and
   the slits in each said wheel are sufficiently long to permit light to pass therethrough in either of the extreme positions of said shaft.

10. The input device according to claim 5, wherein:
    each said shaft support means permits lateral movement of a shaft therein;
    each said resilient means for keeping said rollers in contact with said tracking ball comprises a spring coupled to a corresponding shaft for urging said shaft and attached roller and wheel in the direction of said tracking ball; and
    each said photo detector support means is coupled to the corresponding shaft support means, for horizontal movement in conjunction with the movement of the corresponding shaft.

11. The input device according to claim 10, further comprising:
    one or more function buttons on the top surface of the enclosure;
    one or move momentary switches, equal in number to the number of function buttons, each momentary switch being connected to one of said function buttons so that it is closed when said function button is depressed; and
    means for conveying electrical pulses corresponding to the closure of said momentary switches to an electronic computer.

12. The input device according to claim 10, further comprising:
    one or more function buttons on the top surface of the enclosure;
    one or more momentary switches, equal in number to the number of function buttons, each momentary switch being connected to one of said function buttons so that it is closed when said function button is depressed; and
    means for conveying electrical pulses corresponding to the closure of said momentary switches to an electronic computer.

13. The input device according to claim 8, further comprising:
    one or more function buttons on the top surface of the enclosure;
    one or more momentary switches, equal in number to the number of function buttons, each momentary switch being connected to one of said function buttons so that it closed when said function button is depressed; and
    means for conveying electrical pulses corresponding to the closure of said momentary switches to an electronic computer.

14. The input device according to claim 7, further comprising:
    one or more function buttons on the top surface of the enclosure;
    one or more momentary switches, equal in number to the number of function buttons, each momentary switch being connected to one of said function buttons so that it is closed when said function button is depressed; and
    means for conveying electrical pulses corresponding to the closure of said momentary switches to an electronic computer.

15. The input device according to claim 6, further comprising:
    one or more function buttons on the top surface of the enclosure;
    one or more momentary switches, equal in number to the number of function buttons, each momentary switch being connected to one of said function buttons so that it is closed when said function button is depressed; and
    means for conveying electrical pulses corresponding to the closure of said momentary switches to an electronic computer.

16. An input device for an electronic computer, comprising:
    an enclosure having a top face and a bottom face, the top face and bottom face each having an aperture;
    a tracking ball having a smooth surface and being positioned inside said enclosure for vertical movement therein, and having a lower position in which it projects through the aperture in the bottom face of said enclosure for contacting a supporting surface, and having an upper position in which it projects only through the aperture in the top face of said enclosure without projecting through the aperture in the bottom face of said enclosure to avoid contacting the supporting surface;

adjustable support means coupled to said tracking ball for selectively raising and lowering said tracking ball to project through the bottom aperture when in the lower position and to project only through the aperture in the top face when in the upper position; and first and second means, each coupled to the tracking ball, for generating a series of electrical pulses representing the rotation of said tracking ball about one of two orthogonal axes.

* * * * *